US012494119B1

(12) United States Patent
    Madison

(10) Patent No.: US 12,494,119 B1
(45) Date of Patent: Dec. 9, 2025

(54) MONITORING, DETECTION AND NOTIFICATION SYSTEM OF SPILLS AND LEAKS FROM TANKS AND TIPPING OVER OF VEHICLES, BOATS AND VESSELS

(71) Applicant: Kevin Madison, West Palm Beach, FL (US)

(72) Inventor: Kevin Madison, West Palm Beach, FL (US)

( * ) Notice: Subject to any disclaimer, the term of this patent is extended or adjusted under 35 U.S.C. 154(b) by 0 days.

(21) Appl. No.: 19/055,126

(22) Filed: Feb. 17, 2025

(51) Int. Cl.
    *G08B 21/12* (2006.01)
    *G07C 5/00* (2006.01)
    *G07C 5/08* (2006.01)
    *G08B 25/00* (2006.01)

(52) U.S. Cl.
    CPC ............ *G08B 21/12* (2013.01); *G07C 5/008* (2013.01); *G07C 5/0808* (2013.01); *G08B 25/006* (2013.01)

(58) Field of Classification Search
    CPC ...... G08B 21/12; G08B 25/006; G07C 5/008; G07C 5/0808
    See application file for complete search history.

(56) References Cited

U.S. PATENT DOCUMENTS

| | | | | |
|---|---|---|---|---|
| 4,551,719 A * | 11/1985 | Carlin | ..................... | G01F 23/00 702/182 |
| 5,305,639 A * | 4/1994 | Pontefract | ............... | G01F 23/36 73/317 |
| 5,330,073 A * | 7/1994 | Collins | ..................... | B67D 7/08 222/23 |
| 6,484,088 B1 * | 11/2002 | Reimer | ................ | B60K 15/077 701/123 |
| 6,691,025 B2 * | 2/2004 | Reimer | ................ | B60K 15/077 73/114.38 |
| 8,103,462 B2 * | 1/2012 | Liu | ........................ | F01M 11/12 702/50 |
| 9,030,321 B2 * | 5/2015 | Breed | ..................... | G01S 13/04 455/39 |
| 9,033,116 B2 * | 5/2015 | Breed | ..................... | G01S 13/04 340/568.1 |
| 12,315,310 B1 * | 5/2025 | Arezza | ..................... | G07C 5/04 |
| 2008/0084306 A1 * | 4/2008 | Durtschi | ............. | G06Q 10/087 340/572.1 |
| 2008/0245676 A1 * | 10/2008 | McManus | ............. | B65D 7/045 220/592.2 |
| 2009/0243863 A1 * | 10/2009 | Lease | .................... | G01F 23/804 340/618 |

(Continued)

*Primary Examiner* — Hoi C Lau
(74) *Attorney, Agent, or Firm* — Richard M. Goldberg

(57) ABSTRACT

A system for monitoring, detecting reporting spills of fuel from fuel tanks of mobile vehicles, due to tipping over or an accident, includes a fuel sensor in the fuel tank for monitoring and detecting the fuel in the fuel tank, a positioning sensor for determining a location of the fuel tank, a gyroscope for determining if the fuel tank has rolled over from a stable position or has been impacted in an accident, a microprocessor for determining the amount of fuel in the fuel tank and whether there has been any leakage or spill from the fuel tank, the location of the fuel tank and whether there has been any rolling over of the fuel tank from a stable position or whether there has been an accident as a result of an impact to the fuel tank, and a transmitter for sending out an alarm signal to corresponding authorities.

8 Claims, 11 Drawing Sheets

(56) References Cited

U.S. PATENT DOCUMENTS

| | | | |
|---|---|---|---|
| 2013/0033381 A1* | 2/2013 | Breed | G08B 13/2417 |
| | | | 340/568.1 |
| 2014/0202800 A1* | 7/2014 | Breed | B60T 7/16 |
| | | | 340/568.1 |
| 2017/0130680 A1* | 5/2017 | Dudar | G07C 5/0808 |
| 2023/0122403 A1* | 4/2023 | Buchwald | G01F 23/804 |
| | | | 73/114.38 |
| 2024/0029232 A1* | 1/2024 | Korjani | G06V 20/52 |
| 2025/0157266 A1* | 5/2025 | Arezza | G07C 5/04 |
| 2025/0157267 A1* | 5/2025 | Arezza | G07C 5/008 |
| 2025/0278961 A1* | 9/2025 | Arezza | G07C 5/008 |

\* cited by examiner

ALERTS

MONITORING, DETECTION AND NOTIFICATION SYSTEM OF SPILLS AND LEAKS FROM TANKS AND TIPPING OVER OF VEHICLES, BOATS AND VESSELS

BACKGROUND OF THE INVENTION

The present invention is directed to a monitoring and detecting system of spills and leaks of liquids and gases from vehicles and mobile tanks, and tipping over of vehicles, mobile tanks, boats and vessels, and reporting the same to corresponding authorities and other persons pre-authorized to receive this information.

Rail lines carrying hazardous materials such as fuel, chemicals and propane gas, frequently cross or travel alongside vulnerable rivers and streams, in non-populated areas, as well as near habitable areas and other sensitive areas such as airports, creating the risk of severe damage to waterways and persons in the habitable areas in the event of accidents. Nearly a billion tons of hazardous materials are carried across 140,000 miles of freight railroads in the United States each year. Trains carrying toxic chemicals can endanger our waterways and habitable areas because trains frequently derail, which can result in spills of toxic materials. For example, in 2023, there was a train derailment in East Palestine, Ohio, which resulted in hazardous chemicals being spilled into nearby waterways.

This problem, however, is not limited to rail lines, and can include tanker trucks carrying such hazardous materials if these tanker trucks leak or roll over.

A problem that results is that many of these spills are in remote, rural and non-populated areas, and an extended length of time can occur between the time of the spill and the time that responders become aware of the spill and take any action. This time delay can be disastrous from an environmental and health standpoint.

In like manner, if a vehicle, tank, boat or other vessel is in an accident and/or tips over, endangering the lives of the people on board, this may not be detected sufficiently early to save the persons from bodily harm and/or death, particularly in rural areas and in waterways.

The same applies to aircraft, whether airborne or on the ground. For example, if there is leakage of fuel, this needs to be detected. In like manner, if there are other problems with an airborne aircraft, such as spins, loss of speed, loss of signal from the aircraft, these also need to be detected.

SUMMARY OF THE INVENTION

Accordingly, it is an object of the present invention to provide a monitoring and detecting system of spills and leaks of liquids and gases from vehicles and mobile tanks, due to tipping over of the vehicles and mobile tanks or where the vehicles and mobile tanks are in an accident, that overcomes the aforementioned problems.

It is another object of the present invention to provide such a monitoring and detecting system that also reports the same to corresponding authorities and other persons pre-authorized to receive this information.

It is yet another object of the present invention to provide such a monitoring, detecting and reporting system that determines external factors, such as wind direction and wind speed of which responders need to be aware at the location of the leak or spill.

It is a further object of the present invention to provide such a monitoring, detecting and reporting system that reports up to date live updates of the mobile tanks and vehicles.

It is a still further object of the present invention to provide such a monitoring, detecting and reporting system that reports exact details of the spill, tipping over and/or accident, and the location.

It is a yet further object of the present invention to provide a monitoring, detecting and reporting system that reports tipping over of vehicles, mobile tanks, boats and vessels, and/or whether the vehicles, mobile tanks, boats and vessels have been in an accident, along with exact details of the tipping over and/or accident, and the location.

It is another object of the present invention to provide a monitoring, detecting and reporting system that reports problems with aircraft, whether airborne or on the ground.

In accordance with an aspect of the present invention, there is disclosed a system for monitoring and detecting of spills and leaks of liquids and gases from fuel tanks of mobile vehicles, due to tipping over of the vehicles or from the vehicle being in an accident, and for reporting the spills and leaks to corresponding authorities and other persons pre-authorized to receive this information. The system includes a fuel sensor in the fuel tank for monitoring and detecting the fuel in the fuel tank, regardless of the position and orientation of the fuel tank. A positioning sensor is mounted in close proximity to the fuel tank for determining a location of the fuel tank, and a gyroscope is mounted in close proximity to the fuel tank for determining if the fuel tank has rolled over from a stable position or has been impacted in an accident. A microprocessor is mounted in close proximity to the fuel tank, the microprocessor adapted to receive output signals from the fuel sensor for determining the amount of fuel in the fuel tank and whether there has been any leakage or spill from the fuel tank, the positioning sensor for determining the location of the fuel tank and the gyroscope for determining whether there has been any rolling over of the fuel tank from a stable position or whether there has been an accident as a result of an impact to the fuel tank, and for producing an output signal in response thereto. A transmitter is mounted in close proximity to the fuel tank for sending out an alarm signal and relevant information to corresponding authorities and other persons pre-authorized to receive this information, in response to the output signal from the microprocessor, when the microprocessor determines that there has been a leakage or spill from the fuel tank due to a rolling over of the fuel tank from its stable position, or whether there has been an accident as a result of an impact to the fuel tank.

Preferably, the fuel sensor is non-fixedly positioned at an inner surface at a bottom of the fuel tank, and includes a hydrostatic probe. Still further, a cover partially surrounds the fuel sensor to prevent damage to the inner surface of the fuel tank from the fuel sensor.

A battery provides power to the positioning sensor, gyroscope, microprocessor and transmitter, and preferably, a solar panel mounted in close proximity to the fuel tank for maintaining a charge on the battery.

Preferably, the transmitter includes a transceiver for additionally receiving wind speed and wind direction at the fuel tank location from the National Oceanic and Atmospheric Administration (NOAA) upon detection of a roll-over, impact, leak or spill.

The corresponding authorities and other persons pre-authorized to receive this information, include at least one of the following: police, fire fighters, rescue personnel, emergency medical rescue personnel, nearby hospitals, FEMA, the Department of Transportation, the U.S. Chemical Safety and Hazard Investigation Board (CSB), the Occupational Safety and Health Administration (OSHA), U.S. Coast Guard, owners of the fuel tank, management of the owners of the fuel tank, and family members of personnel associate with the vehicle.

In accordance with another aspect of the present invention, a system is provided for monitoring and detecting tipping over of the vehicles, boats and vessels or whether the vehicles, boats and vessels have been in an accident, and for reporting the same to corresponding authorities and other persons pre-authorized to receive this information. The system includes a positioning sensor mounted to the vehicle, boat or vessel for determining a location thereof, and a gyroscope mounted to the vehicle, boat or vessel for determining if the vehicle, boat or vessel has rolled over from a stable position or has been impacted in an accident. A microprocessor is mounted to the vehicle, boat or vessel, and is adapted to receive output signals from the positioning sensor for determining the location of the vehicle, boat or vessel, and the gyroscope for determining whether there has been any rolling over of the vehicle, boat or vessel from a stable position or whether the vehicle, boat or vessel has been in an accident, and for producing an output signal in response thereto. A transmitter is mounted to the vehicle, boat or vessel for sending out an alarm signal and relevant information to corresponding authorities and other persons pre-authorized to receive this information, in response to the output signal from the microprocessor, when the microprocessor determines that there has been a rolling over of the vehicle, boat or vessel, or whether the vehicle, boat or vessel has been in an accident.

The above and other features of the invention will become readily apparent from the following detailed description thereof which is to be read in connection with the accompanying drawings.

DETAILED DESCRIPTION

Figure 1:
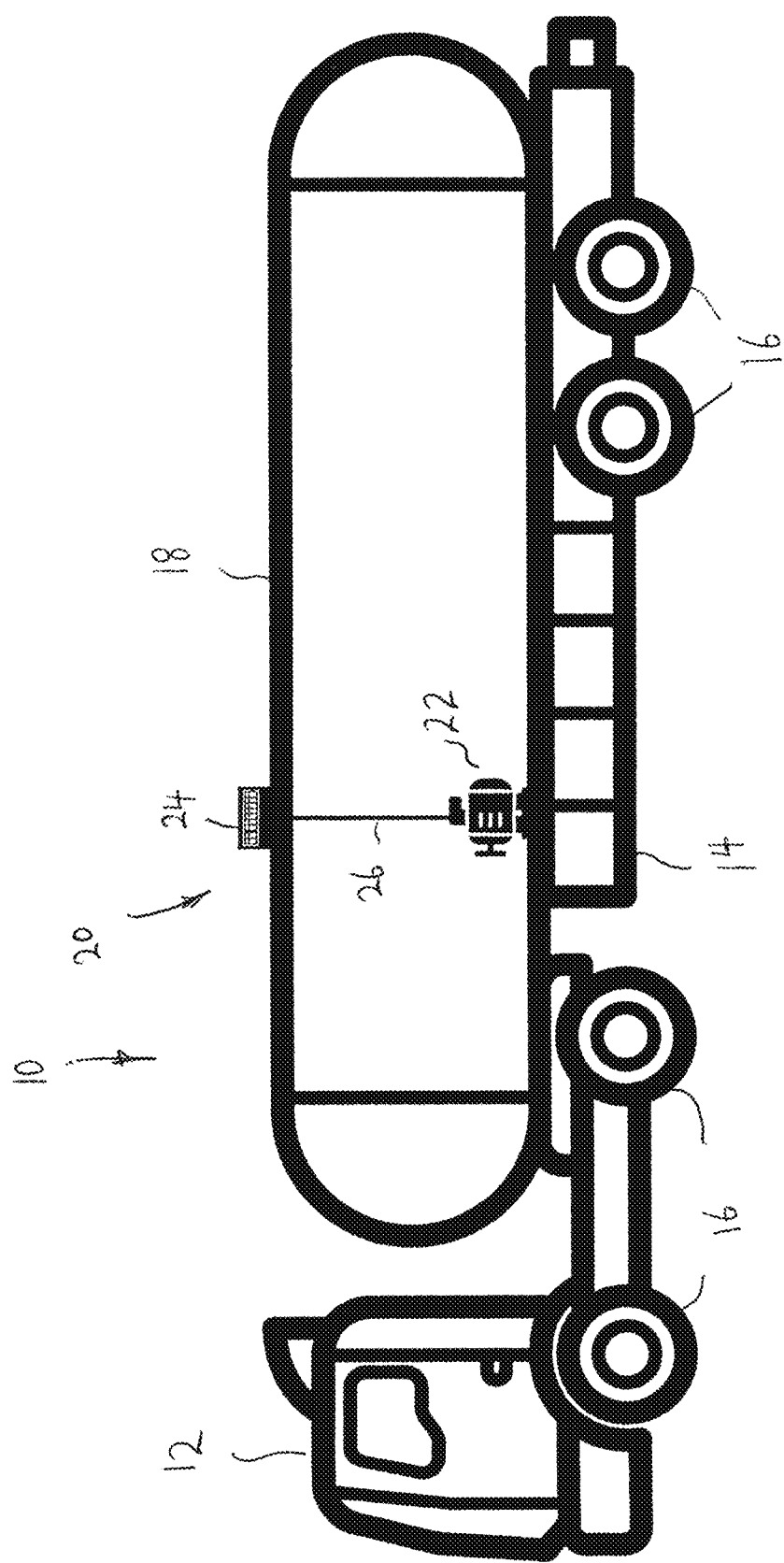
FIG. 1 is a schematic side elevational view, partly in section, showing a single compartment tanker truck with a monitoring, detecting and reporting system according to the present invention.

Referring to the drawings, as initially to FIGS. 1-4, as a first example of the present invention for use in connection with a fuel tanker truck, there is shown a fuel tanker truck 10 with which the present invention can be utilized. Specifically, tanker truck 10 includes a truck cab 12 and an elongated chassis 14 connected to and extending rearwardly of truck cab 12. Wheels 16 are provided on the underside of the truck cab 12 and elongated chassis 14, as is well known. Finally, an elongated single compartment fuel tank 18 is mounted on top of chassis 14 for holding the liquid or gaseous you will therein.

As discussed above, if tanker truck 10 were to leak fuel, roll over or be in an accident, any leakage therefrom would be disastrous to waterways and habitable areas.

In accordance with the present invention, a monitoring, detecting and reporting system 20 is provided for automatically monitoring levels, leaks and spills of liquids and gases from fuel tank 18, and tipping over of fuel tank 18 and/or whether the fuel tank 18 has been in an accident, and reporting the same to corresponding authorities and other persons pre-authorized to receive this information.

Figure 2:
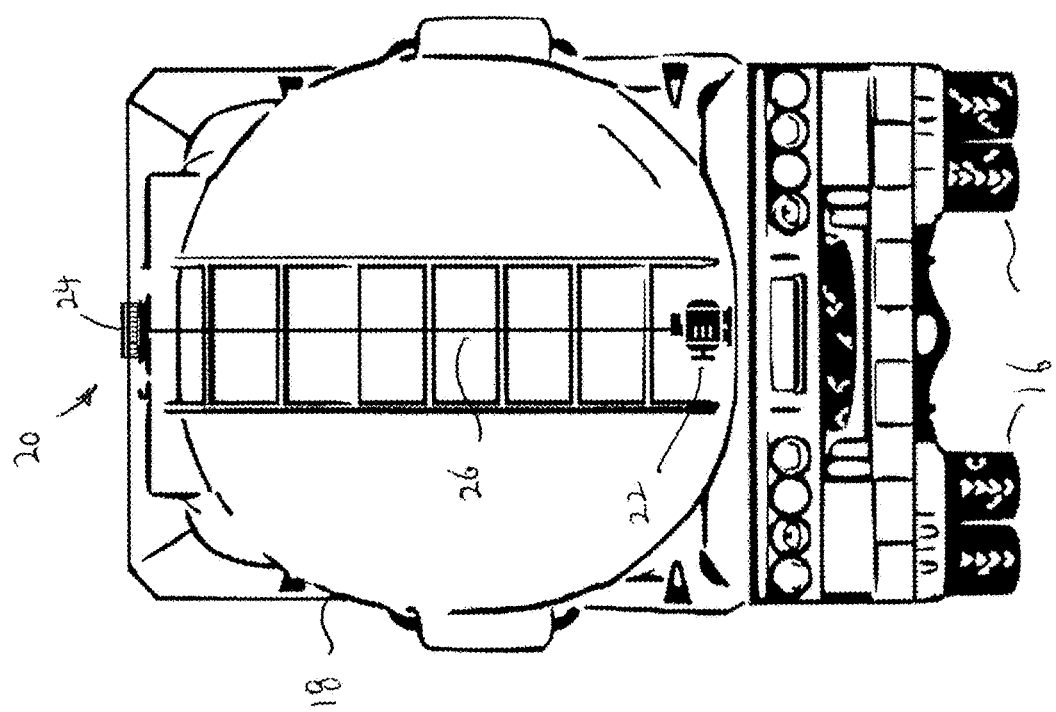
FIG. 2 is a rear elevational view of the single compartment tanker truck with the monitoring, detecting and reporting system of FIG. 1.
Figure 3:
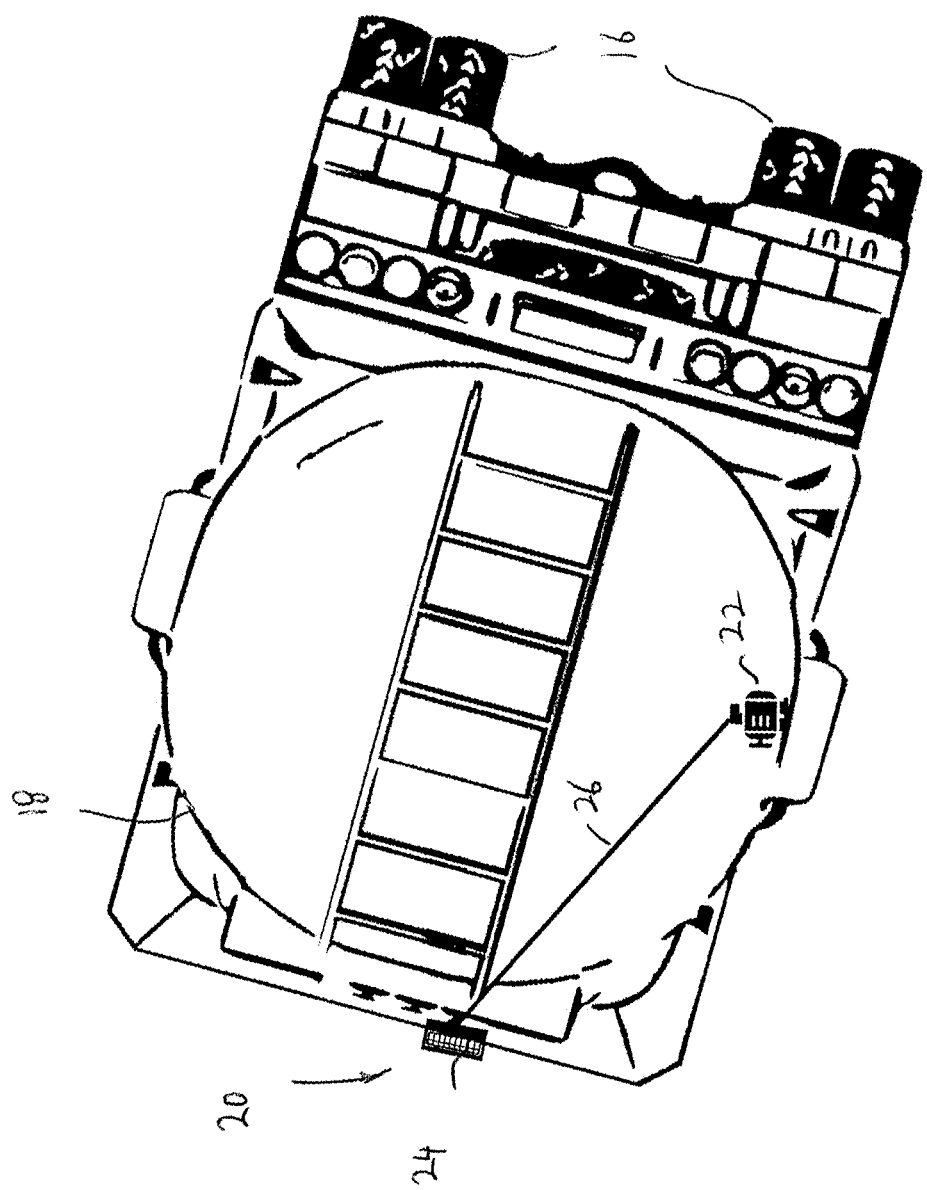
FIG. 3 is a rear elevational view of the single compartment tanker truck with the monitoring, detecting and reporting system of FIG. 1, shown in a rolled over position.

Specifically, as shown in FIGS. 1 and 2, a fuel sensor or probe 22 is provided within fuel tank 18. Preferably, probe 22 is a hydrostatic probe located at the bottom of fuel tank 18, but is not fixed thereto, so that it can move therein. A hydrostatic level sensor or probe is a form of level probe that is used for level monitoring by measuring the hydrostatic pressure in a virtually static liquid at a pre-determined level of submersion. Therefore, if there is a leak in the fuel tank for any reason, hydrostatic probe 22 will monitor and detect any change in the hydrostatic pressure of the fuel. Even if tanker truck 10 has rolled on its side, as shown in FIG. 3, the protected hydrostatic probe 22 is arranged to freely move to the lowest level with the fuel, thereby allowing the system to continually monitor the remaining fuel still contained in fuel tank 18.

A preferred hydrostatic sensor is provided by SkyBitz Inc. of Herndon, Virginia and SkyBitz Tank Monitoring Corporation of Mount Prospect, Illinois.

Figure 4:
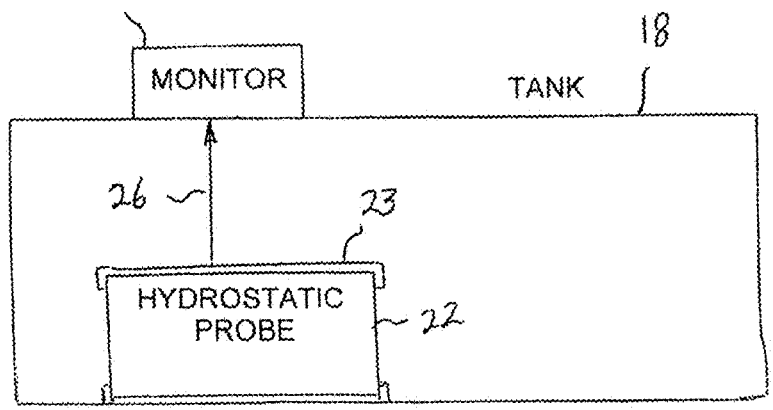
FIG. 4 is a block diagram of the monitoring, detecting and reporting system of FIG. 1.

Because hydrostatic probe 22 is located at the bottom of fuel tank 18, it can cause damage to the inner surface of fuel tank 18. In accordance with the present invention, a plastic, rubber or plastic-rubber cover 23 partially surrounds hydrostatic probe 22 to prevent such damage to the inner surface of fuel tank 18, as shown in FIG. 4. However, cover 23 has opposite ends thereof open to allow fluid flow therethrough in order for hydrostatic probe 18 to measure the hydrostatic pressure within fuel tank 18, and thereby determine the amount of fuel within fuel tank 18.

Hydrostatic probe 22 provides an output signal to a monitor 24 mounted to tanker truck 10 at a position outside of fuel tank 18, either wirelessly or via an electrical wire connection 26. Although monitor 24 is shown connected to the outside of fuel tank 18, the positioning thereof is not so limited, and it can be connected anywhere else, such as on truck cab 12 or elongated chassis 14.

Figure 5:
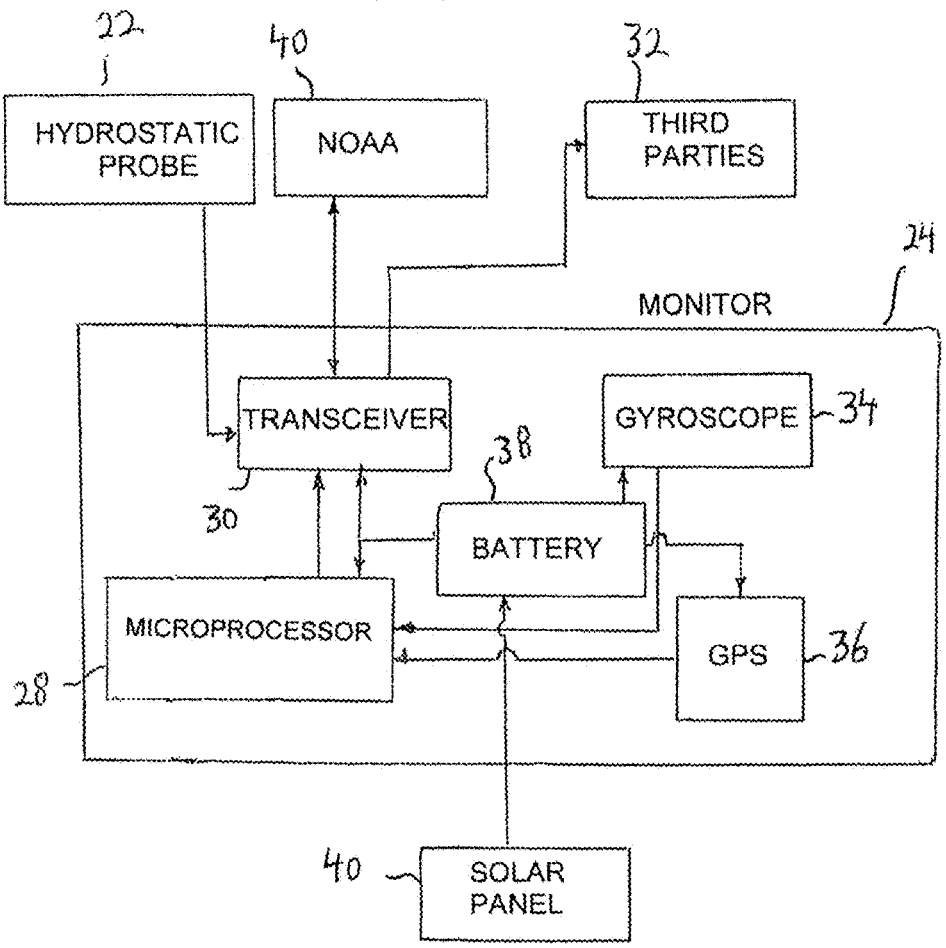
FIG. 5 is a block diagram of the monitor of the monitoring, detecting and reporting system of FIG. 1.

As shown in FIG. 5, monitor 24 includes a central processing unit (CPU) or microprocessor 28 that receives the output signal from hydrostatic probe 22, for example, via a transceiver 30, and from this signal, determines the amount of fuel in fuel tank 18, and whether there has been any leakage or spill from fuel tank 18. Microprocessor 28 transmits a signal to third parties 32, namely, corresponding authorities and other persons pre-authorized to receive this information, regarding the status of the fuel level in fuel tank 18. In this way, the status of the fuel level can always be determined by outside personnel away from the position of tanker truck 10.

This information regarding the fuel level is available at any time by such third parties, and can also be sent at predetermined intervals. However, if there is any fuel spill or leakage, an additional alarm signal will immediately be sent to these third parties, apprising them of the situation.

Monitor 24 further includes a gyroscope 34 connected with microprocessor 28 for detecting any rolling over of fuel tank 18, or whether tanker truck 10 has been in an accident, for example, by way of a sudden impact which is sensed by gyroscope 34. In this way, if tanker truck 10 rolls over or is in an accident, even if there is no immediate fuel spill, an alarm signal regarding the roll over or accident will be sent to the aforementioned third parties 32 to make them aware of the situation. Even if tanker truck 10 does not roll over, but instead has a sudden impact from another vehicle or from tanker truck 10 hitting a stationary object, gyroscope 34 will detect this collision.

Monitor 24 also includes a global positioning satellite (GPS) device 36 that provides a signal to microprocessor 26, so that the location of tanker truck 10 is also sent to the respective personnel.

In addition, a battery 38 is provided within monitor 24 for providing power to microprocessor 28, transceiver 30, gyroscope 34 and GPS device 36. Preferably, a small solar panel 40 is provided on tanker truck 10 to ensure that battery 38 is always fully charged.

Typically, in the case of an accident such an impact with another vehicle, and/or where tanker truck 10 rolls over, there will also be a fuel spill, so that transceiver 30 will send an alarm signal to the relevant third parties, apprising them of the roll over or accident information from gyroscope 34 and the reduction in the fuel level within fuel tank 18 from hydrostatic probe 22.

In addition, transceiver 30 is arranged to continuously receive signals from the National Oceanic and Atmospheric Administration (NOAA) 40 to determine the wind speed and direction at the tanker truck location, which information is also sent to the relevant fire, police and rescue personnel. Alternatively, transceiver 30 is arranged to receive signals from the National Oceanic and Atmospheric Administration (NOAA) 40 to determine the wind speed and direction at the tanker truck location upon detection of a roll-over, impact, leak or spill, which information is also sent to the relevant fire, police and rescue personnel.

Appropriate third parties may include fire fighters, police, rescue personnel, emergency medical personnel and the owner and/or management of the tanker truck 10, and each may be provided different information in accordance with their respective function, for example, whether there has been a roll over and/or accident, a gas spill, wind direction and speed, etc. This information may also be provided to area hospitals to receive alerts to prepare for incoming patients. In addition, these alerts may be supplied to FEMA to allow FEMA to directly notify the public using the emergency notification of the Integrated Public Alert and Warning System (IPAWS), as well as others, such as The Department of Transportation, the U.S. Chemical Safety and Hazard Investigation Board (CSB), the Occupational Safety and Health Administration (OSHA), the U.S. Coast Guard and others. Continuous live updates of this information will also be sent.

As a result, there will be no delay, which could cause serious issues to people in the area and large-scale contamination. Transceiver 30 is able to transmit the relevant information to a cell phone and/or computer. This relevant information may include, but is not limited to, the specific product being transported, the level of fuel in fuel tank 18, the amount of fuel that has leaked from fuel tank 18, etc.

It will be appreciated that, while the fuel sensor or probe 22 has been discussed in relation to a hydrostatic probe, any other suitable fuel sensor or probe 22 can be used, for example, level gauges, lasers which direct beams toward the fuel in fuel tank 18 from different locations therein, etc.

In addition, while the above embodiment has been discussed with respect to fuel, it is equally applicable to chemicals and gases. For example, the cargo can be an RDX explosive that is stored in a wet state and becomes unstable if it dries out. If there is an accident and leakage of liquid within tank 18, the RDX explosive can become unstable and explode.

In addition to the above, hydrostatic probe 22 or any other probe in fuel tank 18 can monitor the temperature of the fuel or other material in tank 18, and supply this information to microprocessor 28. This is important, for example in mobile fuel tanks 18 at airports which contain airplane fuel, which can become unstable at high temperatures. Microprocessor 28 would then transmit this information as well.

Figure 12:
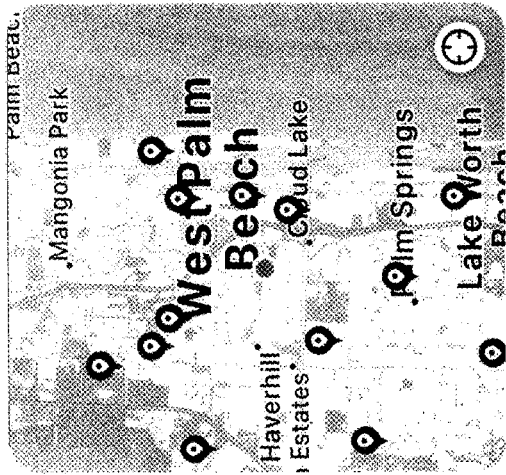
FIG. 12 shows a typical alert screen that is transmitted in response to a fuel leak or spill.
Figure 12:
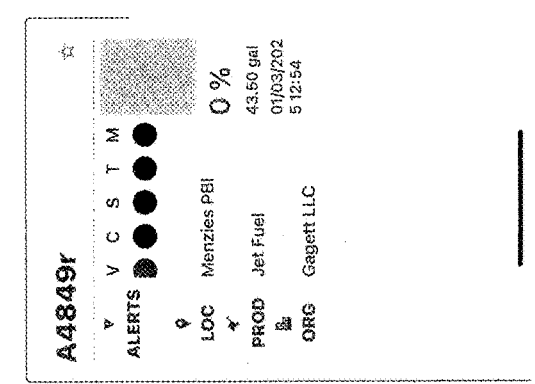
Figure 12:
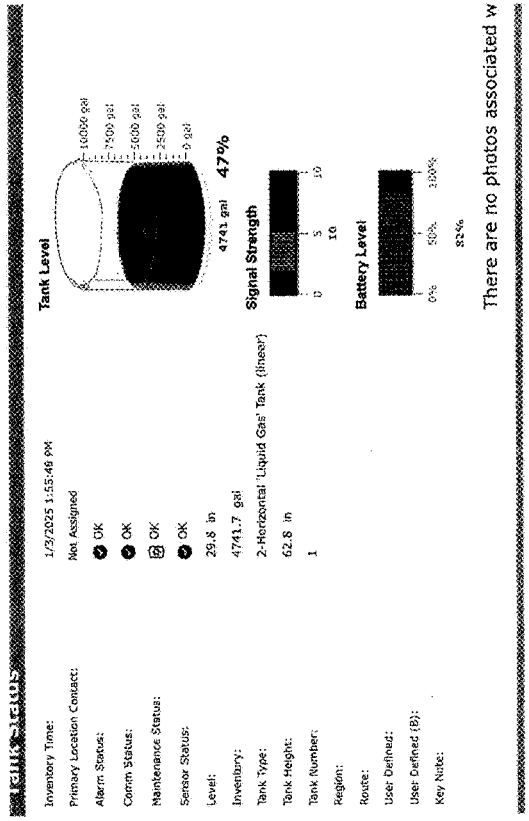

A typical alert screen that is transmitted is shown in FIG. 12, which identifies the location of the accident (West Palm Beach International Airport (PBI)) and habitable areas surrounding the location of the accident, the status levels of various parameters, such as the time, alarm status, level of fuel, amount of fuel in gallons, the type of fuel (jet fuel in this instance), etc.

Figure 6:
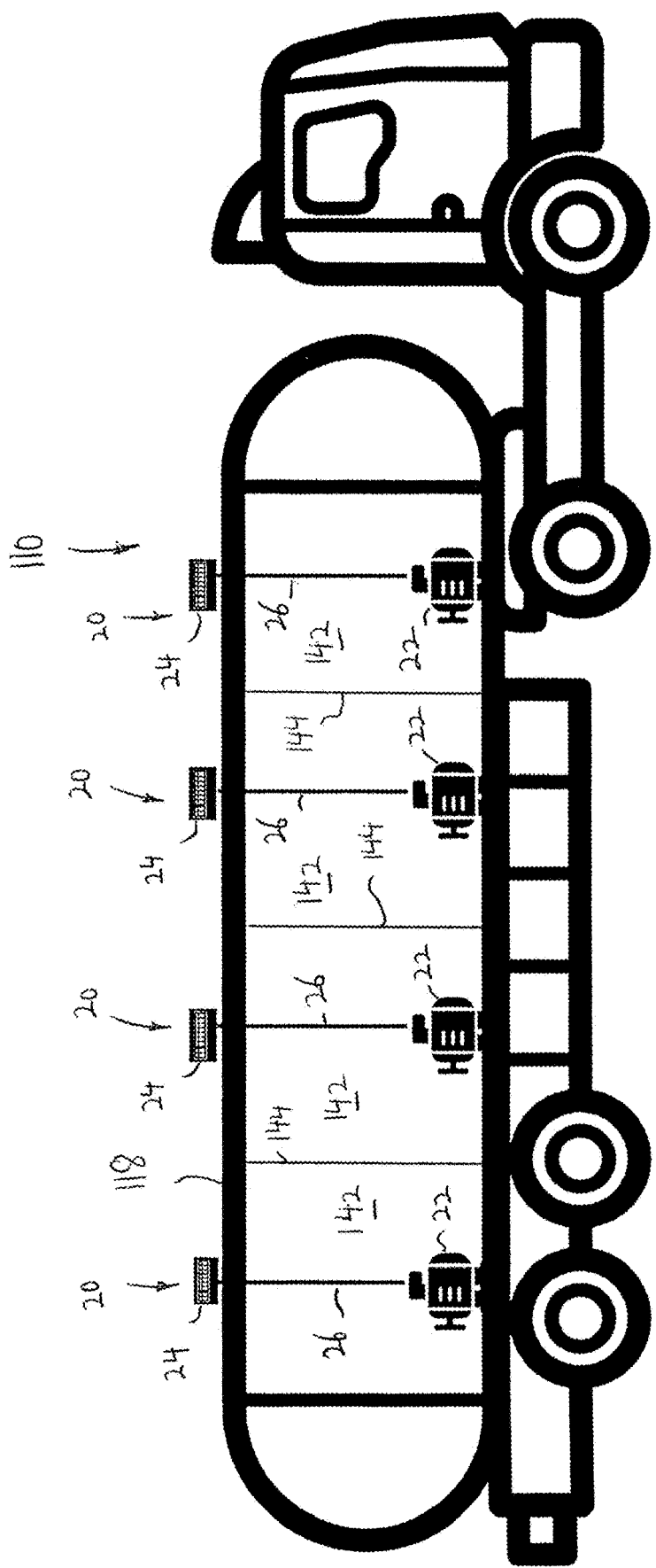
FIG. 6 is a schematic side elevational view, partly in section, showing a multi-compartment tanker truck with a monitoring, detecting and reporting system according to the present invention in each compartment.

Referring to FIG. 6, there is shown a modified multi-compartment tanker truck 110 according to the present invention, in which fuel tank 118 thereof is divided into four compartments 142 by divider walls 144. Each compartment 142 is provided with its own monitoring, detecting and reporting system 20 as described above.

Figure 7:
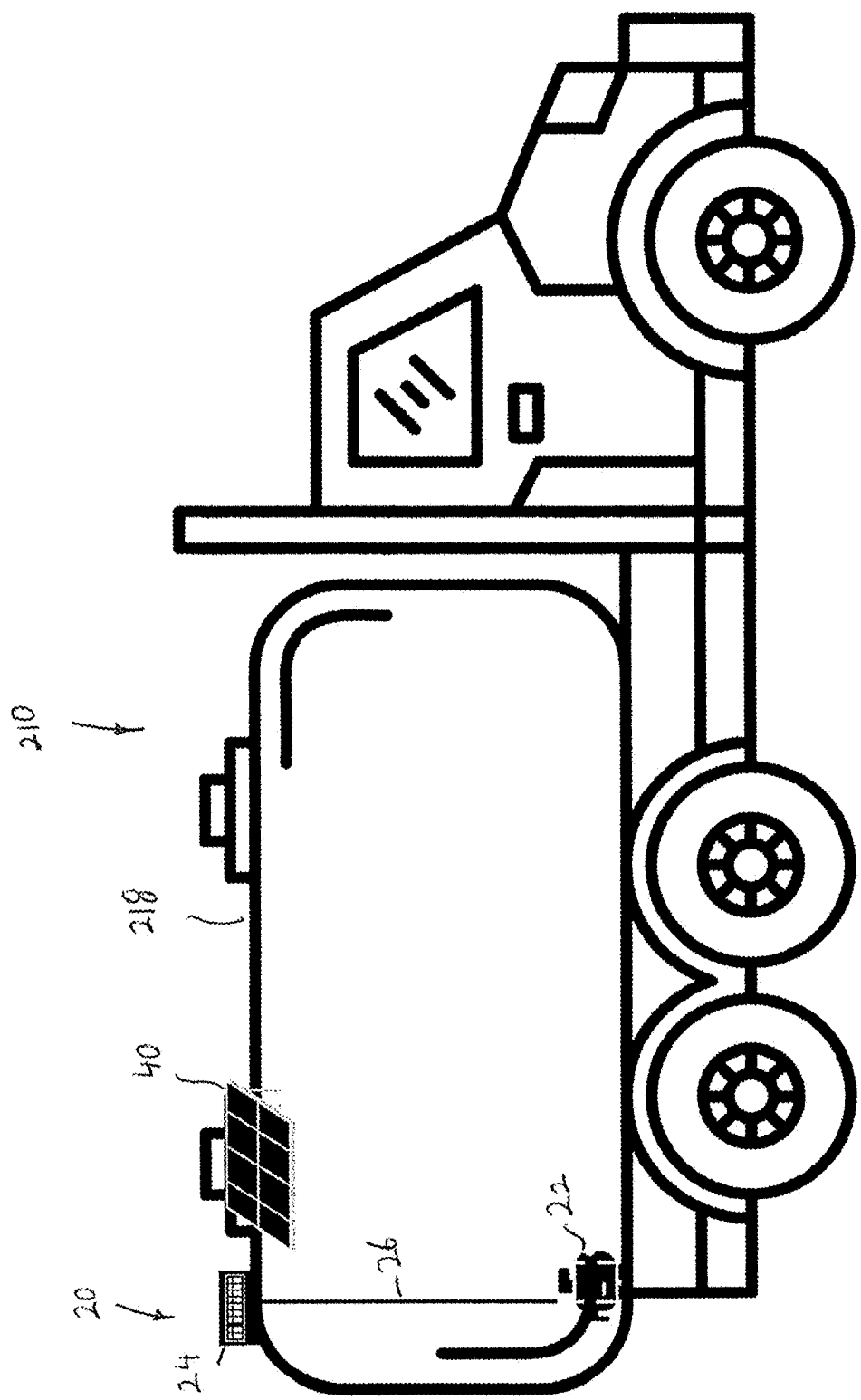
FIG. 7 is a schematic side elevational view, partly in section, showing a propane tanker truck with a monitoring, detecting and reporting system according to the present invention.

FIG. 7 shows a further modified propane tanker truck 210 having a fuel tank 218 mounted thereon, and which is provided with its own monitoring, detecting and reporting system 20 as described above. The solar panel 40 is more clearly shown in this embodiment.

Figure 8:
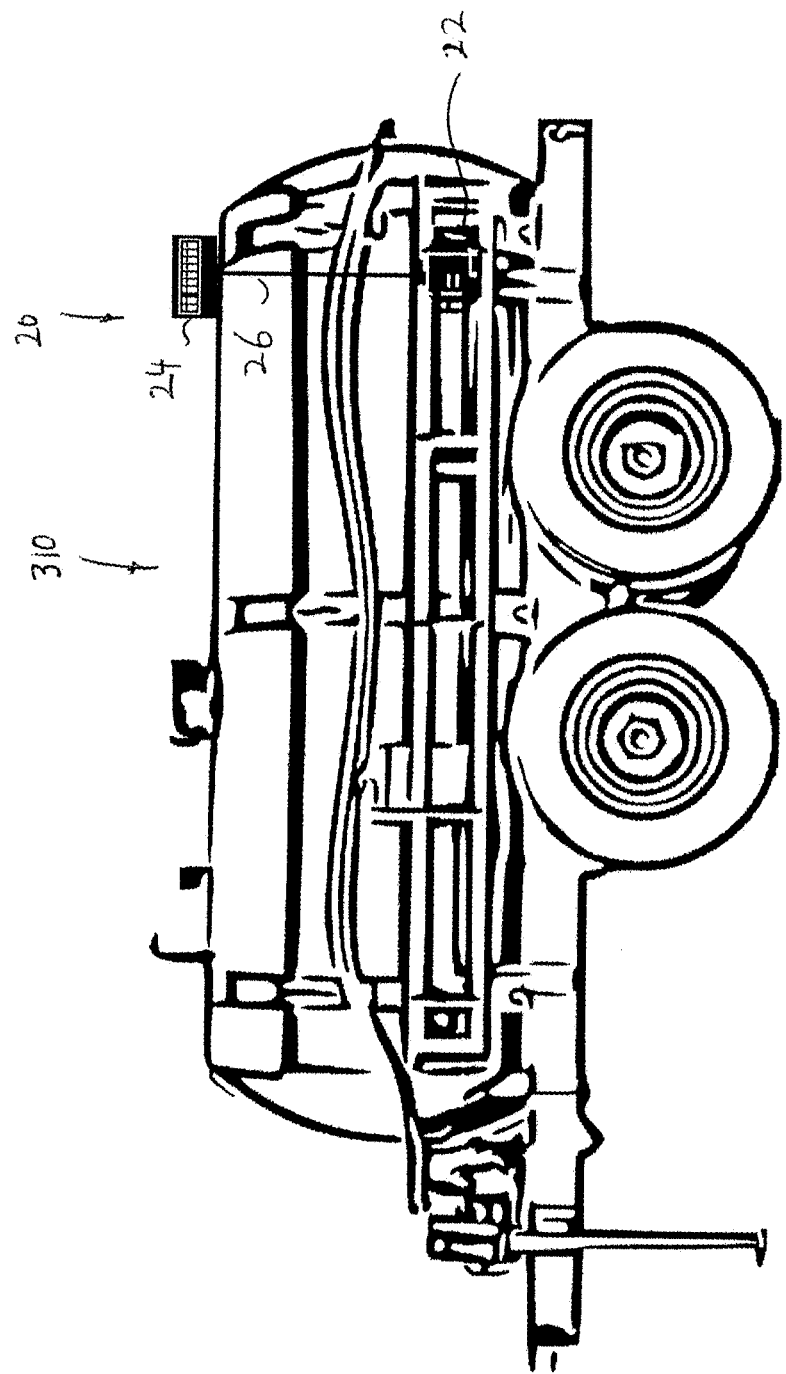
FIG. 8 is a schematic side elevational view, partly in section, showing a tank trailer with a monitoring, detecting and reporting system according to the present invention.
Figure 9:
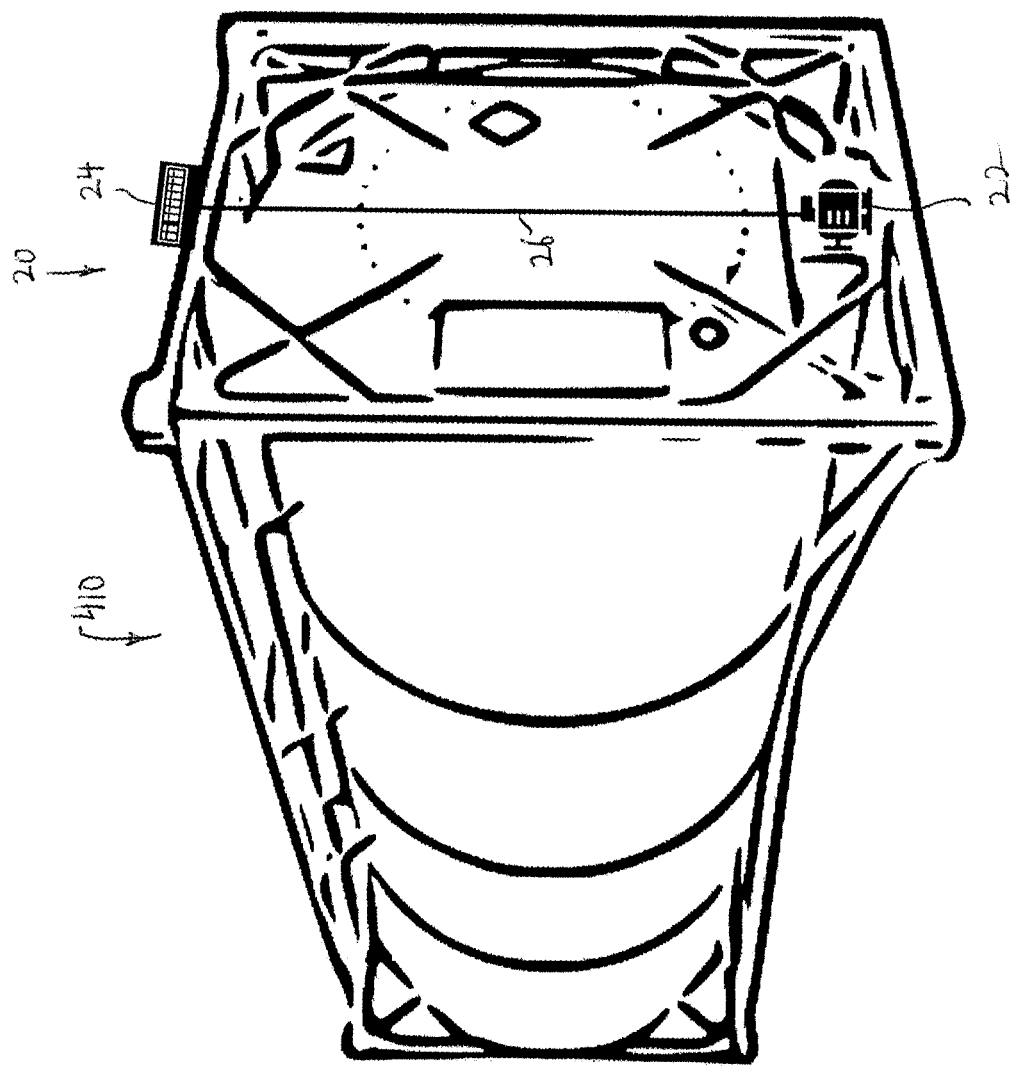
FIG. 9 is a schematic side elevational view, partly in section, showing an intermodal container (ISO tank) with a monitoring, detecting and reporting system according to the present invention.

FIG. 8 shows use of monitoring, detecting and reporting system 20 according to the present invention with a tank trailer 310, while FIG. 9 shows use of monitoring, detecting and reporting system 20 according to the present invention with an intermodal container (ISO tank) 410.

Figure 10:
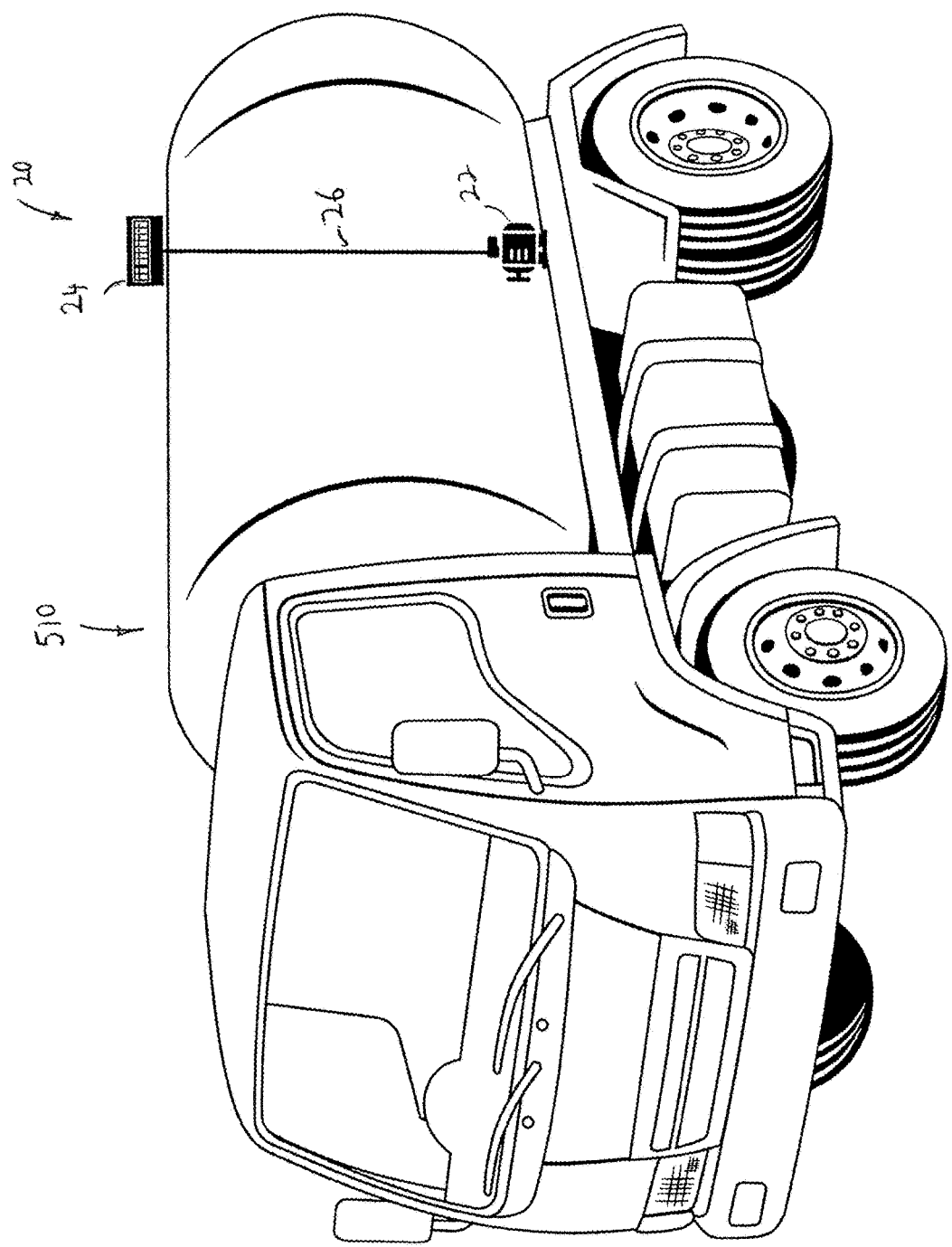
FIG. 10 is a schematic side elevational view, partly in section, showing a chemical truck with a monitoring, detecting and reporting system according to the present invention.

FIG. 10 shows use of monitoring, detecting and reporting system 20 according to the present invention with a chemical truck 510.

Figure 11:
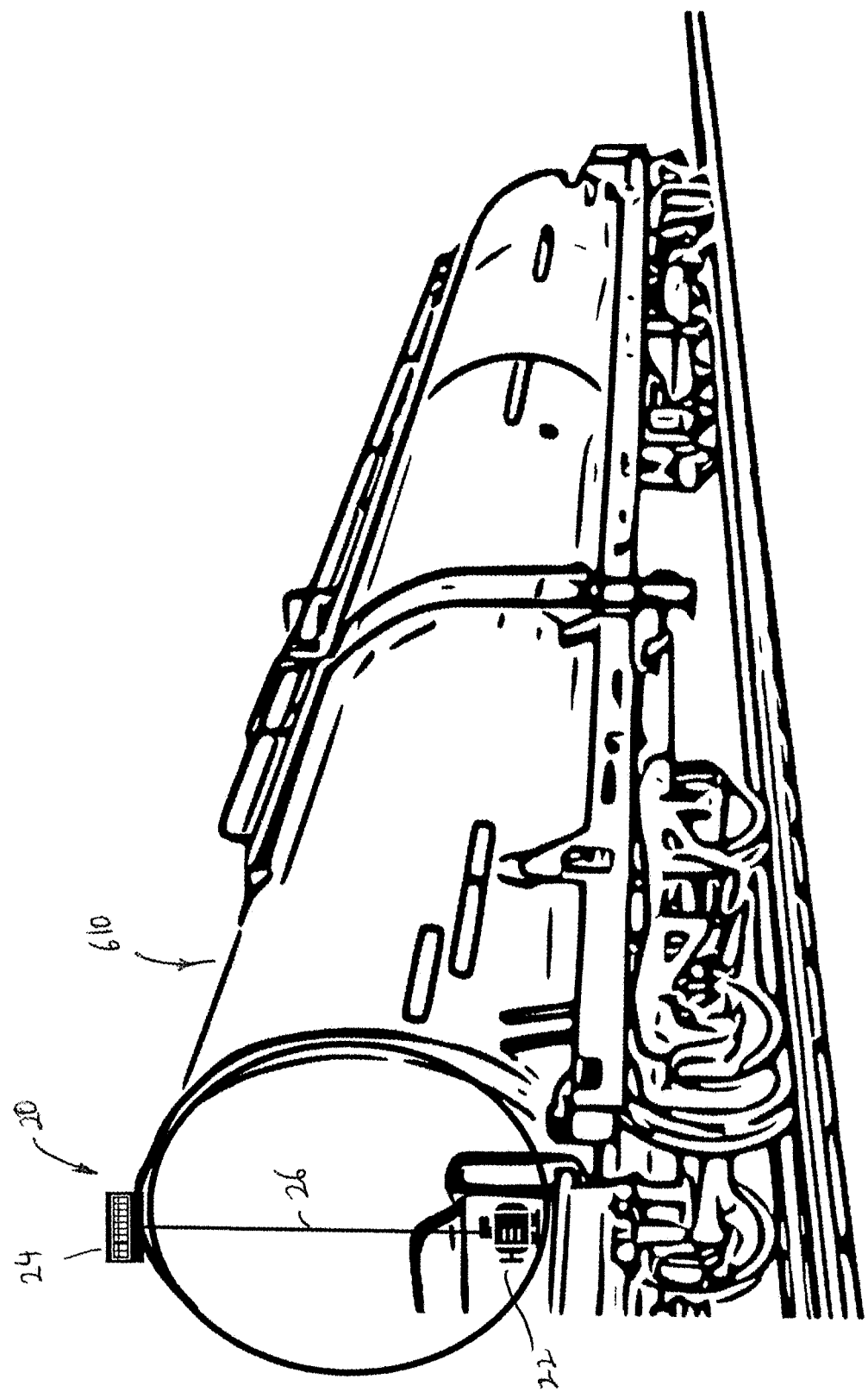
FIG. 11 is a schematic perspective view, partly in section, showing a propane railcar with a monitoring, detecting and reporting system according to the present invention.

As discussed above, rail lines carrying hazardous materials such as fuel, chemicals and propane gas, create the risk of severe damage to waterways and persons in the habitable areas in the event of accidents. For this reason, any railcar of a train carrying such hazardous materials is also provided with its own monitoring, detecting and reporting system 20 as described above. FIG. 11 shows use of monitoring, detecting and reporting system 20 according to the present invention with a propane railcar 610.

While the above embodiments have been discussed in relation to fuel or chemical spills, primarily due to accidents or tipping over, the present invention has broader applications. Specifically, the present invention is also used in situations where it is merely necessary to detect if a vehicle, boat or vessel has been in an accident or has tipped over. For example, the vehicle can be a school bus, a truck carrying other cargo, a boat on the water or the like. In such situation, it is imperative that the accident or roll over be immediately reported, along with other information, such as the location, the number of people carried thereby, etc. For example, for a boat on the water carrying four people that has tipped over, with the people in the water, the coast guard would be immediately notified, and when the coast guard reaches the location, they would know to look for four people in the water.

Thus, the present invention is not limited to land vehicles, but can also be applied to watercraft, such as boats, ships and other water traveling vessels. Thus, if a boat, ship or other water traveling vessel tips or rolls over, an alarm will be sent to police, rescue personnel, emergency medical personnel and other interested persons, such as family members, regardless of whether or not there is a fuel spill or not.

In this situation, hydrostatic probe 22 would not be needed, but rather, only monitor 24 without probe 22 would be required, which is attached to the vehicle, boat or vessel.

The present invention can also be used with aircraft, whether airborne or on the ground. For example, if there is leakage of fuel, this needs to be detected. In like manner, if there are other problems with an airborne aircraft, such as spins, loss of speed, loss of signal from the aircraft, these also need to be detected, and the appropriate personnel are notified.

Any reference to vehicles in the claims includes land vehicles such as tanker trucks, railroad cars, automobiles, etc., watercraft such as boats and ships, and aircraft, whether airborne or on the ground.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention as defined by the appended claims.

What is claimed is:

1. A system for monitoring and detecting of spills and leaks of liquids and gases from fuel tanks of mobile vehicles, due to tipping over of the vehicles or from the vehicle being in an accident, and for reporting said spills and leaks to corresponding authorities and other persons pre-authorized to receive this information, the system comprising:
    a fuel sensor in the fuel tank for monitoring and detecting the fuel in the fuel tank, regardless of the position and orientation of the fuel tank,
    a positioning sensor mounted in close proximity to the fuel tank for determining a location of the fuel tank,
    a gyroscope mounted in close proximity to the fuel tank for determining if the fuel tank has rolled over from a stable position or has been impacted in an accident,
    a microprocessor mounted in close proximity to the fuel tank, the microprocessor adapted to receive output signals from:
        the fuel sensor for determining the amount of fuel in the fuel tank and whether there has been any leakage or spill from the fuel tank,
        the positioning sensor for determining the location of the fuel tank and
        the gyroscope for determining whether there has been any rolling over of the fuel tank from a stable position or whether there has been an accident as a result of an impact to the fuel tank, and
    for producing an output signal in response thereto, and
    a transmitter mounted in close proximity to the fuel tank for sending out an alarm signal and relevant information to corresponding authorities and other persons pre-authorized to receive this information, in response to the output signal from said microprocessor, when said microprocessor determines that there has been a leakage or spill from the fuel tank due to a rolling over of the fuel tank from its stable position, or whether there has been an accident as a result of an impact to the fuel tank.

2. A system according to claim 1, wherein the fuel sensor is non-fixedly positioned at an inner surface at a bottom of the fuel tank.

3. A system according to claim 1, wherein the fuel sensor includes a hydrostatic probe.

4. A system according to claim 1, further comprising a cover partially surrounding the fuel sensor to prevent damage to the inner surface of the fuel tank from the fuel sensor.

5. A system according to claim 1, further comprising a battery for providing power to the positioning sensor, gyroscope, microprocessor and transmitter.

6. A system according to claim 4, further comprising a solar panel mounted in close proximity to the fuel tank for maintaining a charge on said battery.

7. A system according to claim 1, wherein said transmitter includes a transceiver for additionally receiving wind speed and wind direction at the fuel tank location from the National Oceanic and Atmospheric Administration (NOAA) upon detection of a roll-over, impact, leak or spill.

8. A system according to claim 1, wherein said corresponding authorities and other persons pre-authorized to receive this information, include at least one of the following:
    police,
    fire fighters,
    rescue personnel,
    emergency medical rescue personnel,
    nearby hospitals,
    FEMA,
    the Department of Transportation,
    the U.S. Chemical Safety and Hazard Investigation Board (CSB),
    the Occupational Safety and Health Administration (OSHA),
    the U.S. Coast Guard,
    owners of the fuel tank,
    management of the owners of the fuel tank, and
    family members of personnel associate with the vehicle.

* * * * *